United States Patent
Crosbie et al.

(10) Patent No.: US 7,126,937 B2
(45) Date of Patent: Oct. 24, 2006

(54) METHODS AND SYSTEMS FOR CLOCK SYNCHRONIZATION ACROSS WIRELESS NETWORKS

(75) Inventors: David B. Crosbie, Somerville, MA (US); Benjamin J. Walter, Somerville, MA (US); Philip M. Bates, London (GB)

(73) Assignee: Bluesocket, Inc., Burlington, MA (US)

( * ) Notice: Subject to any disclaimer, the term of this patent is extended or adjusted under 35 U.S.C. 154(b) by 1032 days.

(21) Appl. No.: 10/032,199

(22) Filed: Dec. 21, 2001

(65) Prior Publication Data

US 2002/0114303 A1    Aug. 22, 2002

Related U.S. Application Data

(60) Provisional application No. 60/257,544, filed on Dec. 26, 2000.

(51) Int. Cl.
*H04J 3/06*    (2006.01)

(52) U.S. Cl. .................. 370/350; 370/503; 370/507; 370/347; 370/338; 370/337; 370/331

(58) Field of Classification Search ............. 370/350, 370/507, 503, 508
See application file for complete search history.

(56) References Cited

U.S. PATENT DOCUMENTS

| | | | |
|---|---|---|---|
| 5,423,065 A | 6/1995 | Pinard | 455/33.2 |
| 5,448,570 A | 9/1995 | Toda et al. | 370/95.3 |
| 5,809,415 A | 9/1998 | Rossmann | 455/422 |
| 5,901,144 A | 5/1999 | Maki et al. | 370/330 |
| 5,940,591 A | 8/1999 | Boyle et al. | 395/187.01 |
| 5,987,062 A | 11/1999 | Engwer et al. | 375/225 |
| 6,014,558 A | 1/2000 | Thomas | 455/410 |
| 6,018,657 A | 1/2000 | Kennedy, III et al. | 455/426 |
| 6,026,297 A * | 2/2000 | Haartsen | 455/426.1 |

(Continued)

FOREIGN PATENT DOCUMENTS

EP    0 903 873 A1    3/1999

(Continued)

OTHER PUBLICATIONS

Medium Access Control (MAC) and Physical (PHY) Specifications, *MAC Sublayer Management Entity*:123-128, ANSI/IEEE Std 802.11 (1999).

(Continued)

*Primary Examiner*—Ricky Q. Ngo
*Assistant Examiner*—Andrew C. Lee
(74) *Attorney, Agent, or Firm*—Goodwin Procter LLP

(57) ABSTRACT

A wireless local access network includes a hierarchy of access points and mobile devices capable of roaming among the access points. Communications in the network is based on a time division approach, such as a Time Division Multiple Access (TDMA) approach, or spread-spectrum wireless communications approach. An access point that is intermediary in the hierarchy is a slave to a higher level master access point in the hierarchy. The intermediary access point is also master to one or more lower level access points. The intermediary access point synchronizes its clock with its master, and then provides the same synchronization (e.g., clock offset) to any lower level slaves of the intermediary access point so that the lower level slaves can synchronize with the intermediary access point. Thus, the lower level slaves share synchronization with the intermediary access point and the higher level master access point. A mobile device that is attached to one access point (such as the higher level master access point) is able to transfer to another access point (such as a lower level access point) without being required to resynchronize the mobile device's clock.

25 Claims, 8 Drawing Sheets

U.S. PATENT DOCUMENTS

| | | | |
|---|---|---|---|
| 6,038,458 A | 3/2000 | Siira | 455/560 |
| 6,081,900 A | 6/2000 | Subramaniam et al. | 713/201 |
| 6,115,615 A | 9/2000 | Ota et al. | 455/553 |
| 6,134,591 A | 10/2000 | Nickles | 709/229 |
| 6,137,791 A | 10/2000 | Frid et al. | 370/352 |
| 6,172,986 B1 | 1/2001 | Watanuki et al. | 370/466 |
| 6,195,705 B1 | 2/2001 | Leung | 709/245 |
| 6,243,581 B1 | 6/2001 | Jawanda | 455/432 |
| 6,377,548 B1 | 4/2002 | Chuah | 370/233 |
| 6,427,174 B1 | 7/2002 | Sitaraman et al. | 709/245 |
| 6,493,749 B1 | 12/2002 | Paxhia et al. | 709/220 |
| 6,633,761 B1 | 10/2003 | Singhal et al. | 455/436 |
| 6,675,015 B1 * | 1/2004 | Martini et al. | 455/436 |
| 6,731,939 B1 * | 5/2004 | Watanabe et al. | 455/450 |
| 6,754,250 B1 * | 6/2004 | Haartsen | 375/132 |
| 6,816,510 B1 * | 11/2004 | Banerjee | 370/503 |
| 6,834,192 B1 * | 12/2004 | Watanabe et al. | 455/444 |
| 2001/0001268 A1 | 5/2001 | Menon et al. | 370/329 |
| 2001/0012777 A1 | 8/2001 | Igarashi et al. | 455/435 |
| 2001/0014917 A1 | 8/2001 | Ishiyama et al. | 709/227 |
| 2001/0016492 A1 | 8/2001 | Igarashi et al. | 455/433 |
| 2001/0017856 A1 | 8/2001 | Asokan et al. | 370/389 |
| 2001/0020241 A1 | 9/2001 | Kawamoto et al. | 707/202 |
| 2001/0023446 A1 | 9/2001 | Balogh | 709/229 |
| 2001/0024443 A1 | 9/2001 | Alriksson et al. | 370/401 |
| 2001/0031634 A1 | 10/2001 | Mizutani et al. | 455/425 |
| 2001/0036224 A1 | 11/2001 | Demello et al. | 375/220 |
| 2001/0044305 A1 | 11/2001 | Reddy et al. | 455/436 |
| 2001/0048686 A1 | 12/2001 | Takeda et al. | 370/401 |
| 2002/0010758 A1 | 1/2002 | Chan | 709/218 |
| 2002/0013831 A1 | 1/2002 | Astala et al. | 709/220 |
| 2002/0032855 A1 | 3/2002 | Neves et al. | 713/154 |
| 2002/0032858 A1 | 3/2002 | Nakano et al. | 713/159 |
| 2002/0034298 A1 | 3/2002 | Gallagher et al. | 380/247 |
| 2002/0034301 A1 | 3/2002 | Andersson | 380/270 |
| 2002/0035699 A1 | 3/2002 | Crosbie | 713/201 |
| 2002/0037708 A1 | 3/2002 | McCann et al. | 455/411 |
| 2002/0046179 A1 | 4/2002 | Kokudo | 705/51 |
| 2002/0046285 A1 | 4/2002 | Yasushi et al. | 709/228 |
| 2002/0052965 A1 | 5/2002 | Dowling | 709/230 |
| 2002/0066029 A1 | 5/2002 | Yi | 713/201 |
| 2002/0066032 A1 | 5/2002 | Kurumida | 713/201 |
| 2002/0066036 A1 | 5/2002 | Makineni et al. | 713/201 |
| 2002/0069278 A1 | 6/2002 | Forslow | 709/225 |
| 2002/0073240 A1 | 6/2002 | Kokkinen et al. | 709/249 |
| 2002/0075844 A1 | 6/2002 | Hagen | 370/351 |
| 2002/0085719 A1 | 7/2002 | Crosbie | |
| 2002/0087335 A1 | 7/2002 | Meyers et al. | 705/1 |
| 2002/0098840 A1 | 7/2002 | Hanson et al. | 455/435 |
| 2002/0101848 A1 | 8/2002 | Lee et al. | 370/349 |

FOREIGN PATENT DOCUMENTS

| | | | | |
|---|---|---|---|---|
| EP | 0 964 599 A | 12/1999 | | |
| EP | 0 982 662 A | 3/2000 | | |
| EP | 0 984 639 A | 3/2000 | | |
| EP | 1 011 243 A1 | 6/2000 | | 29/6 |
| WO | WO 00/36522 | 6/2000 | | 15/16 |
| WO | WO 01/50781 A2 | 7/2001 | | |
| WO | WO 02/09458 A2 | 1/2002 | | |
| WO | PCT/US02/08986 | 3/2002 | | |
| WO | WO 02/41587 A2 | 5/2002 | | 12/28 |

OTHER PUBLICATIONS

Bluetooth Specification Version 1.1, *Section 10.9 Scatternet*:120-123 (2001).

Bluetooth Specification Version 1.1, *Part C: Link Manager Protocol*:184-252 (2001).

Bluetooth Specification Version 1.1, *Part H:1: Host Controller Interface Functional Specification*:536-780 (2001).

Bluetooth Specification Version 1.1, *Part H:2: HCI USB Transport Layer*:782-796 (2001).

Bluetooth Specification Version 1.1, *Part H:3: HCI RS232 Transport Layer*:798-818 (2001).

Bluetooth Specification Version 1.1, *Part H:4: HCI UART Transport Layer*:820-826 (2001).

Berger, S., et al., "Pervasive Networking Using Bluetooth: A Status Report and Future Plans," *Presentation Slides and Paper* (21 pgs.); IBM Watson Research Center (1999).

Bluetooth Specification Version 1.1,*Part K:9: Lan Access Profile*: 275-308 (2001).

"PSDN Solution for CDMA2000 Networks," (2 pgs.) [online], [Retrieved on Jan. 25, 2002]. *Retrieved from the Internet*: <URL:http://www.cisco.com/warp/public/779/servpro/solutions/wireless_mobile/pdsn.html>.

Cisco White Paper, "Cisco Code-Division Multiple Access Performance Management", (15 pgs.) [online], [Retrieved on Jan. 25, 2002]. *Retrieved from the Internet*: <URL:http://www.cisco.com/warp/public/779/servpro/solutions/wireless_mobile/pdsn.html>.

ETSI HIPERLAN/2 standard [online], Sep. 2000, (3 pgs.) [online], [Retrieved on Jul. 16, 2001]. *Retrieved from the Internet*: <URL:http://www.etsi.org/technicalactiv/hiperlan2.htm>.

Haartsen, J., "Bluetooth-The universal radio interface for *ad hoc*, wireless connectivity", *Ericsson Review No. 3*, pp. 110-117, 1998, XP000783249 ISSN: 0014-0171.

Lough et al., "A Short Tutorial on Wireless LANs and IEEE 802.11", (5 pgs.) [online], [Retrieved on Oct. 16, 2001]. *Retrieved from the Internet*: <URL:http://www.computer.org/students/looking/summer97/ieee802.htm>.

Mitzel, D., "Overview of 2000 IAB Wireless Internetworking Workshop", (40 pgs.) [online], Dec. 2000 [Retrieved on Jan. 25, 2002]. *Retrieved from the Internet*: <URL:http://www.ietf.org/rfc/rfc3002.txt?number=3002>.

T. Muller, "Bluetooth White Paper", *Bluetooth Security Architecture Version 1.0*: 1-33 (1999).

Perkins, C., "IP Mobility Support", (67 pgs.) [online], Oct. 1996 [Retrieved on Sep. 16, 2002]. *Retrieved from the Internet*: <URL:http://www.ietf.org/rfc/rfc2002.txt?number=2002>.

"A Practical Approach to Identifying and Tracking Unauthorized 802.11 Cards and Access Points", (26 pgs.) [online], [Retrieved on Sep. 10, 2001]. *Retrieved from the Internet*: <URL:http://www.interlinknetworks.com/graphics/news/wireless_detection_and _tracking.pdf>.

"RoamAD" (6 pgs.) [online], [Retrieved on Sep. 16, 2002]. *Retrieved from the Internet*: <URL:http://www.roamad.com/roam>.

R. Schneiderman, "Bluetooth's slow dawn: Hype gives way to hard work as expectations for the mini radio network encounter nettlesome interoperability issues," *IEEE Spectrum*: 61-65 (2000).

Solomon, J., "Applicability Statement for IP Mobility Support", (5 pgs.) [online], Oct. 1996 [Retrieved on Jan. 25, 2002]. *Retrieved from the Internet*: <URLhttp://www.ietf.org/rfc/rfc2005.txt?number=2005>.

Townsley, W., et al., "Layer Two Tunneling Protocol 'L2TP'," [online], Aug. 1999 [Retrieved on Aug. 29, 2001]. *Retrieved from the Internet*:<URL:http://www.ietf.org/rfc/rfc2661.txt?number=2661>.

Vernier Networks Whitepaper, "Controlling the Network Edge: Vernier Networks and the Enterprise", (7 pgs.) [online], Jun. 2002 [Retrieved on Sep. 10, 2002]. *Retrieved from the Internet*: <URL:www.verniernetworks.com>.

Vernier Networks Whitepaper, "High Availability for Wireless Edge Connectivity", (6 pgs.) [online], Jun. 2002 [Retrieve on Sep. 10, 2002]. *Retrieved from the Internet*: <URL:www.verniernetworks.com>.

Vernier Networks Whitepaper, "The Vernier Networks System", (7 pgs.) [online], [Retrieve on Sep. 10, 2002]. *Retrieved from the Internet*: <URL:www.verniernetworks.com>.

Vernier Networks Whitepaper, "The Three Phases of WLAN Deployments", (2 pgs.) [online], Jun. 2002 [Retrieve on Sep. 10, 2002]. *Retrieved from the Internet*: <URL:www.verniernetworks.com>.

Vernier Networks Whitepaper, "Vernier Networks: Ensuring the Promise of 802.11b Networks", (5 pgs.) [online], Jun. 2002 [Retrieve on Sep. 10, 2002]. *Retrieved from the Internet*: <URL:www.verniernetworks.com>.

Vernier Networks Whitepaper, "Wireless Security: Protecting Your 802.11 Network", (3 pgs.) [online], Jun. 2002 [Retrieve on Sep. 10, 2002]. *Retrieved from the Internet*: <URL:www.verniernetworks.com>.

International Search Report for International Application No.: PCT/US01/23145, dated Aug. 16, 2002.

International Search Report for International Application No.: PCT/US02/08986, dated Aug. 19, 2002.

Bluesocket Press Release "Bluesocket Secures 5M in First-Round Funding from St. Paul Venture Capital and Osborn Capital LLC", (2 pages) [online], [Retrieved on Nov. 19, 2002]. *Retrieved from the Internet*: <URL:http://www.bluesocket.com/news/funding.html>.

Bray et al., "Bluetooth—Connect Without Cables", (New Jersey, Prentice Hall, Mar. 20, 2001), XP002221666, p. 84, ¶5.7—p. 86, ¶5.8.

Bray et al., "Bluetooth—Connect Without Cables", (New Jersey, Prentice Hall, Mar. 20, 2001), XP002221667, p. 115-118.

Mouly et al., "GSM—The System for Mobile Communications" (Palaiseau, France, Sep. 2, 1993), XP002221665, p. 327-330.

International Search Report for International Application No.: PCT/US01/51306, dated Dec. 3, 2002.

Bluetooth Specification Version 1.0 B, *10 Channel Control* (Nov. 29, 1999), pp. 95-126.

International Search Report for International Application No.: PCT/US01/49547, dated Feb. 28, 2003.

International Search Report for International Application No.: PCT/US02/30558, dated Mar. 28, 2003.

\* cited by examiner

METHODS AND SYSTEMS FOR CLOCK SYNCHRONIZATION ACROSS WIRELESS NETWORKS

RELATED APPLICATION(S)

This application claims the benefit of U.S. Provisional Application No. 60/257,544, filed Dec. 26, 2000. The entire teachings of the above application are incorporated herein by reference.

BACKGROUND OF THE INVENTION

In a wireless local area network (WLAN), a mobile device (e.g., PDA or personal digital assistant) accesses the WLAN through a wireless connection to an access point (AP). One commonly used approach for such a WLAN is to base the communications in the network on a time slot or time slicing approach, such as a Time Division Multiple Access (TDMA) approach in which the various devices in the WLAN must be synchronized in order to communicate with each other. In a conventional WLAN, access points (e.g., local area network access points or LAP's) provide access for a mobile device to the WLAN and to other networks, such as hard wired local area networks and global networks, such as the Internet.

The Bluetooth protocol is one example of such a wireless network based on Time Division Multiple Access (TDMA). The Bluetooth technology is described in the Bluetooth specification, available from Bluetooth SIG, Inc. (see also the www.bluetooth.com web site), the entire teachings of which are incorporated herein by reference. This technology provides for a common attachment approach for different devices, and so enables mobile phones, laptops, headsets, and PDA's to be easily networked in the office and eventually in public locations. Other standards, such as the IEEE (Institute of Electrical & Electronics Engineers) 802.11 and ETSI (European Telecommunications Standards Institute) HIPERLAN/2, provide a generally similar wireless connection function as Bluetooth and may be used to support WLAN communications. See the IEEE 802.11 "Wireless LAN Medium Access Control (MAC) and Physical Layer Specifications," the entire teachings of which are incorporated herein by reference. See also the ETSI specifications for HIPERLAN/2, such as ETSI document number TR 101 683, "Broadband Radio Access Networks (BRAN); HIPER-LAN Type 2; System Overview," the entire teachings of which are incorporated herein by reference Both the IEEE 802.11 and ETSI HIPERLAN/2 protocols differ from the Bluetooth protocol, in that the IEEE 802.11 and ETSI HIPERLAN/2 protocols use a spread spectrum rather than a frequency hopping approach to sharing a channel between noncoordinated users (e.g., users of the same spectral band that make no effort to avoid cross-interference). To coordinate nodes within a IEEE 802.11 or HIPERLAN/2 network a series of timing beacons are used. These beacons ensure that the timing of the nodes can be synchronized to that of the access point for that network. The HIPERLAN/2 protocol differs from the IEEE 802.11 protocol in that the HIPERLAN/2 protocol uses an Asynchronous Transfer Mode (ATM) approach. Thus the HIPER-LAN/2 protocol provides for the breaking of incoming IP packets into a number of smaller packets that are transferred to the destination node in a time division approach (e.g., TDMA) manner which avoids collisions. The approach of the IEEE 802.11 protocol attempts to reserve the wireless medium in order to send the whole packet, and if there is a packet collision, the IEEE 802.11 approach is to back off an amount of time (e.g., of random duration) before retrying.

The Bluetooth protocol provides for a single Bluetooth piconet consisting of one master device and up to seven slave devices that are synchronized to a common clock so that the devices can exchange data. The Bluetooth protocol assumes that different piconets are not synchronized.

SUMMARY OF THE INVENTION

Though the medium sharing mechanism varies between the different radio (wireless communication) protocols (as described above for Bluetooth, IEEE 802.11, ETSI HIPER-LAN/2) all require clock synchronization between access points in order to perform seamless hand-offs of mobile devices between access points.

The present invention provides a method for wireless synchronization of time division (e.g., TDMA) and spread spectrum wireless communications (e.g., IEEE 802.11 and ETSI HIPERLAN/2) networks. The approach of the present invention may be used to synchronize a Bluetooth network, but it may be applied to a wide range of wireless protocols and technologies, such as, but not limited to, DECT (Digital Enhanced Cordless Communications), GPRS (General Packet Radio Service) based communications, IEEE 802.11, and ETSI HIPERLAN/2. The present invention provides for the synchronization of access points in WLAN's (based on any of the above protocols) so that mobile devices can more readily transfer from one access point to another without requiring the mobile device to resynchronize or establish a new synchronization with the target (transferred to) access point.

In a one embodiment of the present invention, an access point that is intermediary in the hierarchy is a slave to a higher level master access point in the hierarchy. The intermediary access point is also master to one or more lower level access points. The intermediary access point synchronizes its clock with its master, and then provides the same synchronization (e.g., clock offset) to any lower level slaves of the intermediary access point so that the lower level slaves can synchronize with the intermediary access point. Thus, the lower level slaves share synchronization with the intermediary access point and the higher level master access point. A mobile device that is attached to one access point (such as the higher level master access point) is able to transfer to another access point (such as a lower level access point) without being required to resynchronize (e.g., adjust the mobile device's clock).

Thus, the present invention provides methods and systems for synchronizing access points in a wireless local area network to enable a seamless transfer of a mobile device in the wireless local area network. The communications in the wireless local area network are based on timing patterns (e.g., for a time division or TDMA network). In particular, the system includes a gateway server that includes a communication interface and a digital processor coupled to the communication interface. The communication interface communicates with an initial access point, a second access point, and a third access point. The initial access point has an initial timing pattern; the second access point has a second timing pattern; and the third access point has a third timing pattern. The digital processor hosts and executes a gateway application that configures the digital processor to direct the second access point to synchronize with the initial access point. The second access point adjusts the second timing pattern to match the initial timing pattern to produce a synchronized second timing pattern for use by the second access point. The gateway application also configures the digital processor to direct the third access point to synchronize with the second access point. The third access point adjusts the third timing pattern to match the synchronized second timing pattern of the second access point to produce a synchronized third timing pattern for use by the third access point. The gateway application also configures the digital processor to perform a connection transfer of an initial link between the mobile device and the initial access point to a transferred link between the mobile device and the third access point. This connection transfer thus provides for the seamless transfer of the mobile device as a function of synchronization of the initial access point with the third access point based on the initial timing pattern and the synchronized third timing pattern.

In one aspect of the present invention, the initial access point, the second access point, and the third access point form a set of synchronized access points; and the wireless local area network includes further access points. The gateway application configures the digital processor to instruct each further access point to synchronize with one of the synchronized access points so that each further access point joins the set of synchronized access points to enable the seamless transfer of the mobile device from any one of the set of synchronized access points to any other one of the set of synchronized access points.

The wireless local area network, in another aspect, includes a first piconet designated as a top level in a hierarchy of piconets and a second piconet designed as a second level in the hierarchy. The initial access point has a master role for the first piconet. The second access point has a slave role in the first piconet. The second access point also has a master role for the second piconet concurrently with having the slave role in the first piconet. The third access point has a slave role in the second piconet.

In a further aspect, the second access point has a first set of timing registers controlling a slave clock phase for the slave role in the first piconet, and a second set of timing registers controlling a master clock phase for the master role in the second piconet. The gateway application configures the digital processor to instruct the second access point to transfer a clock offset value from the first set of timing registers to the second set of timing registers to synchronize the slave role in the first piconet with the master role in the second piconet.

In another aspect, the timing patterns are based on time slots. The gateway application configures the digital processor to instruct the second access point to perform further slave roles in the first piconet in a first set of time slots available to the second access point. The gateway application configures the digital processor to instruct the second access point to perform further master roles for further piconets in a second set of time slots selected from time slots available to the second access point exclusive of the first set of time slots.

In a further aspect, the gateway application configures the digital processor to instruct the second access point to eliminate guard periods in transmissions of the second access point based on synchronizing the initial access point with the second access point and synchronizing the third access point with the second access point.

The gateway application, in another aspect, configures the digital processor to perform the connection transfer for the mobile device at a transfer rate that supports substantially uninterrupted voice communication to the mobile device from a voice communication source through the first access point and through the third access point during the connection transfer.

In another aspect, the transfer rate is less than about 80 milliseconds.

In a further aspect, the gateway application configures the digital processor to instruct the second access point to receive a first timing beacon provided by the initial access point, and to instruct the third access point to receive a second timing beacon provided by the second access point.

In another aspect, the wireless local area network is based on a spread-spectrum wireless communications protocol (e.g., IEEE 802.11, or ETSI HIPERLAN/2).

In another aspect, the present invention is directed to a system (e.g., a gateway server in communication with access points) for synchronizing access points in a wireless local area network to enable a seamless transfer of a mobile device in the wireless local area network. The communications in the wireless local area network are based on timing patterns (e.g., for a time division or TDMA network). The system includes an initial access point, a second access point, a third access point, and a gateway server. The second access point synchronizes with the initial access point. The second access point has a second timing pattern and adjusts the second timing pattern to match the initial timing pattern to produce a synchronized second timing pattern for use by the second access point. The third access point synchronizes with the second access point. The third access point has a third timing pattern and adjusts the third timing pattern to match the synchronized second timing pattern of the second access point to produce a synchronized third timing pattern for use by the third access point. The gateway server performs a connection transfer of an initial link between the mobile device and the initial access point, to a transferred link between the mobile device and the third access point. This connection transfer is performed in a manner that provides a seamless transfer of the mobile device as a function of synchronization of the initial access point with the third access point based on the initial timing pattern and the synchronized third timing pattern.

In an 802.11 embodiment of the present invention, there is a similar hierarchy of access points (e.g., initial access point, second access point, and third access point) used in order to synchronize clocks, but the clocks are used to drive timing beacons provided by the access points. In order for an access point (e.g., second access point) lower in the hierarchy to synchronize to the appropriate access point (e.g., initial access point), the lower level access point listens for that beacon provided by the higher level access point as if the lower level access point were a mobile device, and the lower level access point resets its clock so that its beacon is synchronized. This is a similar process as followed by a mobile device joining an "Infrastructure" (hierarchical) network controlled by an access point. In the approach of the present invention, the synchronization is maintained when the lower level access point switches back to its role as an access point.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
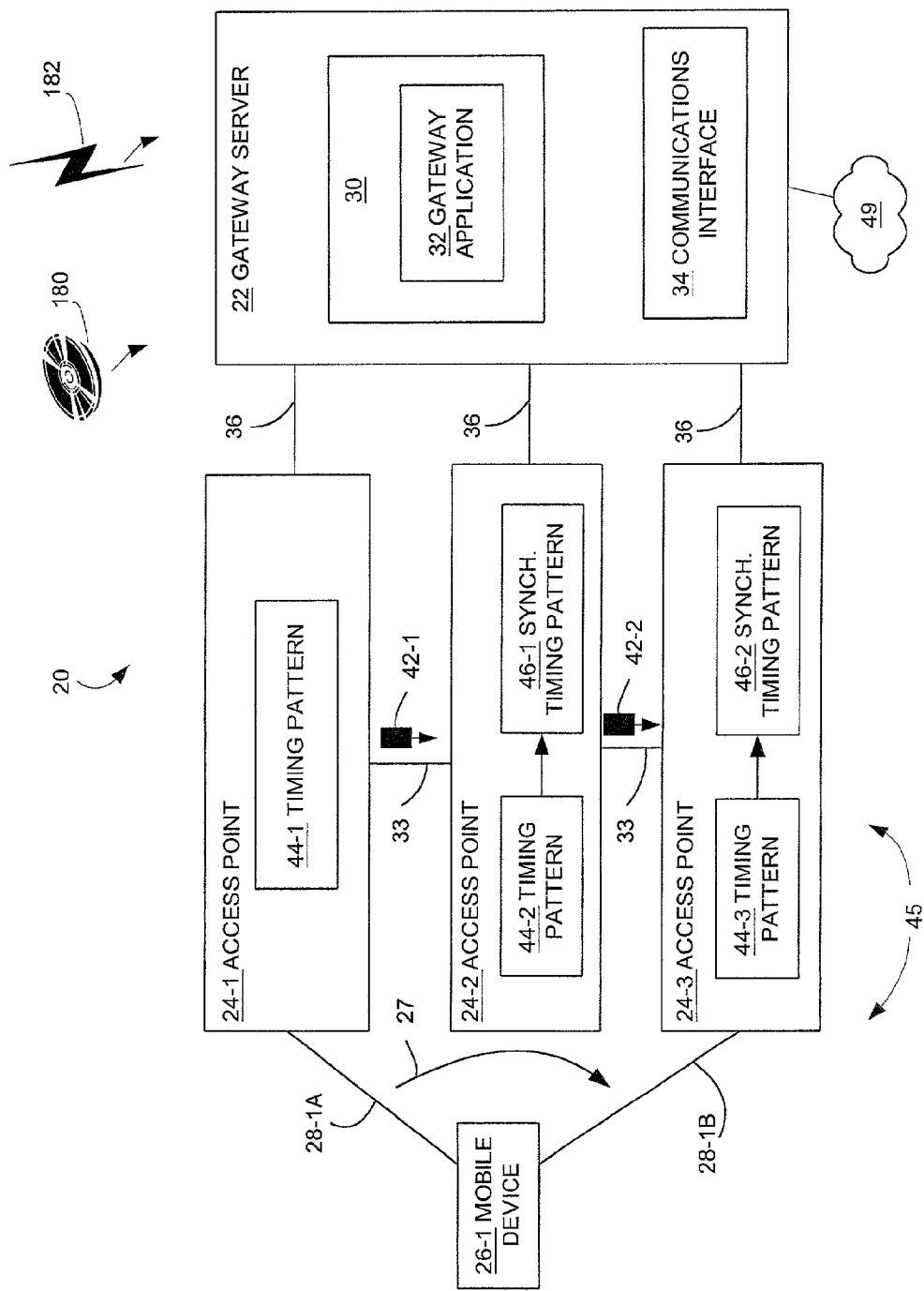
FIG. 1 is a block diagram of a network environment showing access points, a gateway server, and a mobile device, according to the present invention.

FIG. 1 is a block diagram of a network environment 20 showing access points 24 (e.g., 24-1, 24-2, 24-3), a gateway server 22, and a mobile device 26-1. The mobile device 26 (e.g., 26-1 in FIG. 1, 26-1, 26-2, in FIG. 3, 26-3 in FIG. 4, and 26-4 in FIG. 6) is any type of suitable portable communications device that supports wireless technology and communication protocols, such as the Bluetooth protocol, the IEEE 802.11 protocol, and/or the ETSI HIPERLAN/2 communications protocol. In general, as used herein, the term "wireless technology" refers to a Bluetooth protocol technology, a IEEE 802.11 protocol technology, a ETSI HIPERLAN/2 protocol technology, DECT protocol technology, GPRS-based communications or other wireless technology suitable for a WLAN 45 (e.g., typically providing coverage over 10 to 100 meters). The mobile device 26 can be, for example, a laptop computer, a PDA (personal digital assistant), or a mobile telephone, such as a cellular telephone, or other portable communications or computing device. The access point 24 (e.g., 24-1 through 24-12 in FIGS. 1, 3, 4, and 6) is a communication device (e.g., computing device) that acts a receiving point or connecting point to establish a wireless connection 28 (e.g., 28-1A or 28-1B) to a mobile device 26-1. The connection 28 (or link) is a wireless communication connection based on a wireless technology, such as the Bluetooth protocol technology, the IEEE 802.11 protocol technology, ETSI HIPERLAN/2 technology or other wireless technology suitable for wireless communications in a WLAN.

The wireless connection 33 provides communication between access points 24-1, 24-2, 24-3. The connection 33 is a wireless connection (similar to connection 28) or, in other embodiments, is a hard-wired connection such as an Ethernet LAN.

The connections 28 and 33 are timing based communications between a mobile device 26 and an access point 24 and among access points 24, such as for a time division wireless communications network For example, the timing communications for the connections 28, 33 may be based on a Time Division Multiple Access (TDMA) technology or protocol or other timing based communications protocol that provides for time slots or time slicing for the communications among communication devices. The access points 24-1, 24-2, 24-3 and mobile device 26-1 form a time division network 45 (e.g., TDMA network).

The access point 24-1 includes an initial timing pattern 44-1. The access point 24-2 includes a timing pattern 44-2, and the access point 24-3 includes a timing pattern 44-3. The timing pattern 44 (e.g., timing patterns 44-1 through 44-6 in FIGS. 1 and 5) is a timing communications pattern that is used in the timing based (e.g., TDMA) communications over connections 28 to mobile devices 26. For example, the timing pattern 44 may divide up a communications signal into a number of time slots or time slices and the connection (for example, 28-1A between mobile device 26-1 and access point 24-1) is based on one of those time slots in a timing pattern 44-1.

For the mobile device 26-1 to communicate with the access point 24-1 over the connection 28-1A, both the access point 24-1 and mobile device 26-1 must share the same timing pattern 44-1 for the communications over the connection 28-1A to be successful. Typically, this synchronization between the mobile device 26-1 and the access point 24-1 in a conventional WLAN occurs by the mobile device 26-1 synchronizing its timing pattern with a timing pattern 44-1 of the access point 24-1.

The access point 24-2, in the present invention, includes a synchronized timing pattern 46-1 and the access point 24-3 includes a synchronized timing pattern 46-2. The synchronized timing pattern 46-1, 46-2 is based on the timing pattern 44-2, 44-3, respectively, for the same access point 24. For example, the synchronized timing pattern 46-1 is based on the timing pattern 44-2 of the access point 24-2 but modified or adjusted so that the synchronized timing pattern 46-1 matches the timing pattern 44-1 of the access point 24-1.

In a preferred embodiment, the access point 24-1 sends out a timing signal 42-1 that the access point 24-2 uses to produce the synchronized timing pattern 46-1, which is then synchronous with the timing pattern 44-1 of access point 24-1. In a similar manner, the access point 24-3 uses the timing signal 42-2 provided by the access point 24-2 in order to produce a synchronized timing pattern 46-2 based on the timing pattern 44-3 of the access point 24-3. Thus, based on the timing packet 42-2, the synchronized timing pattern 46-2 is synchronous with the synchronized timing pattern 46-1. The timing signal 42 (e.g., 42-1, 42-2) provides timing information as part of the signal 42 or as indicated by when the signal 42 is sent. The timing signal 42, in one embodiment, may be based on a packet protocol. In one embodiment, the timing signal 42 is a dummy or NULL packet, and the receiving access point (e.g., 24-2) must listen for the timing packet (or beacon) in certain time slots (see FIG. 8).

In one embodiment, the timing signal 42 is a packet of timing data sent over connections 33 between the access points 24-1, 24-2 and 24-3 that provides timing information that allows the synchronization of the access points 24-1, 24-2 and 24-3. See FIG. 6 for an example of timing signals 42 for one example of synchronization.

The gateway server 22 is a server or other computing or communications device, such as a bridge, a router switch, or other network device. The gateway server 22, includes a digital processor 30 (e.g., microprocessor) and a communications interface 34. The digital processor 30 hosts and executes a preferred embodiment of a gateway application 32 (stored in a working memory associated with the digital processor 30) that configures the digital processor 30 to manage the access points 24 and their synchronization. When the gateway server 22 is referred to herein as performing some function, this means that the digital processor 30 of the gateway server 22 is performing that function based on the instructions of the gateway application 32 that is hosted and executing on the digital processor 30.

The communications interface 34, includes communications, hardware and software that provides communications in the network environment 20 or communications for other connections 36 (wireless or hard wired cable) to other entities, such as the access points 24. In one embodiment, the network connection 36 is a hard wired connection, such as an Ethernet connection or a local area network (LAN) connection. In another embodiment, the network connection 36 is a wireless connection based on a wireless technology or other suitable wireless communications protocol. The gateway server 22 may also communicate with other gateway servers and/or other network resources 49, such as servers and computing devices over a network 49 such as an Internet Protocol (IP) network, such as the Internet.

In one embodiment, a computer program product 180, including a computer readable or usable medium (e.g., one or more CDROM's, diskettes, tapes, etc.), provides software instructions for the gateway application 32. The computer program product 180 may be installed by any suitable software installation procedure, as is well known in the art. In another embodiment, the software instructions may also be downloaded over a wireless connection. A computer program propagated signal product 182 embodied on a propagated signal on a propagation medium (e.g., a radio wave, an infrared wave, a laser wave, a sound wave, or an electrical wave propagated over the Internet or other network) provides software instructions for the gateway application 32. In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of the computer program product 180 is a propagation medium that the computer may receive and read, such as by receiving the propagation medium and identifying a propagated signal embodied in the propagation medium, as described above for the computer program propagated signal product 182.

Figure 2:
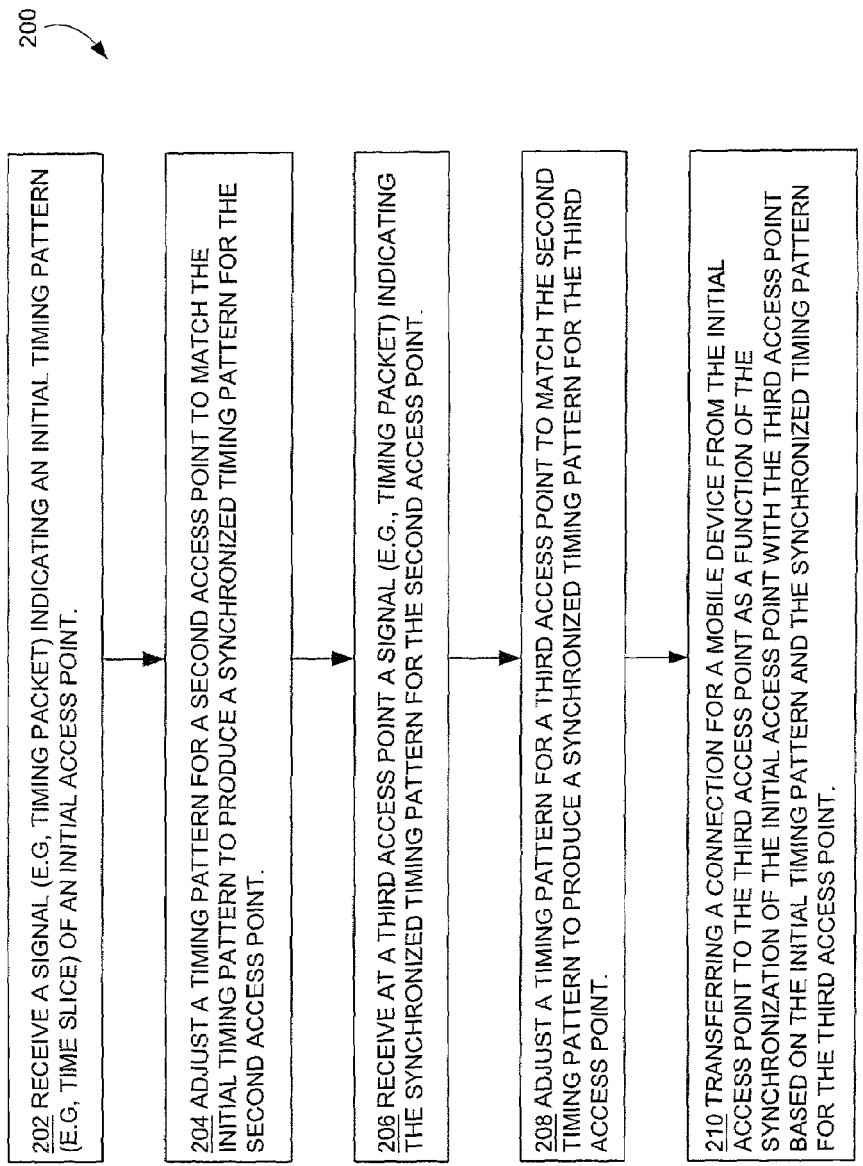
FIG. 2 illustrates a flow chart of a procedure for synchronizing the access points of FIG. 1.

FIG. 2 illustrates a flow chart of a procedure 200 for synchronizing access points 24 in the networked environment 20. In step 202, the access point 24-2 receives a timing signal 42-1 (e.g., packet) indicating an initial timing pattern (e.g., time slice) 44-1 of an initial access point 24-1.

In step 204, the access point 24-2 adjusts a timing pattern 44-2 for the access point 24-2 to match the indicated initial timing pattern 44-1 to produce a synchronized timing pattern 46-1 for the second access point 24-2. For example, the access point 24-2 can use the received timing signal 42-1 to compare the clock or timing for the access point 24-1 to the clock or timing of the access point 24-2 to determine a clock offset or difference in timing that indicates the difference in synchronization between the indicated initial timing pattern 44-1 and the timing pattern 44-2. The initial timing pattern 44-1 may be based on oscillator located in access point 24-1, and the timing pattern 44-2 may be based on an oscillator located in access point 24-2. The access point 24-2 uses the received timing signal 42-1 to determine the difference between the timing patterns 44-1, 44-2 (e.g., oscillators) and, from that difference, determine an offset value to apply to the timing pattern 44-2 to produce a synchronized timing pattern 46-1, which is synchronous with the indicated initial timing pattern 44-1 (see FIGS. 5 and 6). In one embodiment, the access point 24-2 initiates step 204. In another embodiment, the gateway server 22 directs the access point 24-2 to perform step 204.

In step 206, the access point 24-3 receives a timing signal 42-2 indicating the newly produced synchronous timing pattern 46-1 for the second access point 24-2. The access point 24-3 uses the timing signal 42-2 to determine the difference between the timing patterns 46-1 and 44-3, and uses the difference in step 208.

In step 208, the access point 24-3 adjusts a timing pattern 44-3 for the access point 24-3 to match the second (newly produced) synchronized timing pattern 46-1 to produce a synchronized timing pattern 46-2 for the access point 24-3. In one embodiment, the access point 24-3 initiates step 208. In another embodiment, the gateway server 22 directs the access point 24-3 to perform step 208. As a result, based on the synchronized second timing pattern 46-1, the third synchronized timing pattern 46-2 is synchronized with the initial timing pattern 44-1 of the access point 24-1 in steps 202–208.

In step 210, the gateway server 22 transfers the connection 28-1 for a mobile device 26-1 from the initial access point 24-1 (initial link 28-1A) to the third access point 24-3 (transferred link 28-1B) as a function of the synchronization (from prior steps 202–208) of the initial access point 24-1 with the third access point 24-3, as indicated by communications link transfer 27. The mobile device 26-1 maintains synchronization when changing the connection 28-1A (initial link) to the connection 28-1B (transferred link) with access point 24-3. The gateway server 22 initiates this transfer of a mobile device 26-1 from access point 24-1 to access point 24-3 as the result of some triggering event that indicates that a transfer of the mobile device 26-1 is appropriate.

For example, a communications interface 34 of the gateway server 22 detects a triggering event that initiates a transfer of the mobile device 26-1 from the initial access point 24-1 to another (target) access point 24-3. This transfer is indicated by a communications link transfer 27 in FIG. 1. Such a triggering event can be the moving of the mobile device 26-1 (e.g., when the user moves the mobile device 26-1 from one location to another), or receiving a request from a mobile device 26-1 or access point 24-1 to transfer the connection 28-1 for the mobile device 26-1.

For example, the triggering event can occur when the mobile device 26-1 is moved by the user from one location to another so that the mobile device 26-1 is moving out of range of the initial access point 24-1 and into range of the target access point 24-3. The triggering event can also be indicated by congestion or the need for load balancing for the initial access point 24-1. For example, wireless connection 28-1A becomes congested (or access point 24-1 becomes congested) in comparison to a level of congestion predicted for transferring the wireless connection 28-1A to wireless connection 28-1B (e.g., so that the mobile device 26-1 can be moved to another access point 24-3 to obtain a higher level of service, such as more bandwidth). The triggering or initiating event can also be based on receiving an indication of the quality of service level assigned to the user of the mobile device 26-1 (e.g., moving the mobile device 26-1 to a new access point 24-3 to fulfill a predefined service level for the user of the mobile device 26-1). Furthermore, the triggering event can also be an indication of a poor or declining quality of the connection 28-1A (e.g., radio link) between the mobile device 26-1 and an access point 24-1 (e.g., resulting in a transfer of the mobile device 26-1 from one access point 24-1 to another access point 24-3 that provides an improved quality of service for the mobile device 26-1 over the connection 28-1B). Thus, as a result of the triggering event, the gateway server 22 (or an access point 24-1 or 24-3) initiates the transfer of the mobile device 26-1 from the initial access point 24-1 to the access point 24-3.

In a Bluetooth implementation of the present invention, a triggering event is indicated, in one example, by a weakening reception of the wireless signal from the mobile device 26-1 (i.e., slave). The master access point 24-1 is maintaining a connection 28-1A to a particular slave 26-1 and signals to the controller (gateway server 22) that there is weakening reception for that slave 26-1. This weakening reception may be indicated by increased packet loss on the PPP (point to point) link or connection 28-1A to that particular slave 26-1, and/or by another indication of weakening reception, such as RSSI (Received Signal Strength Indication).

In one embodiment, the gateway server 22 transfers the connection 28-1 for the mobile device 26-1 from the initial access point 24-1 to the third access point 24-3 sufficiently rapidly so that there is no noticeable interruption in communications (e.g., voice communications) by a user of the mobile device 26-1 (or any drop-out or transmission error can be readily masked). In other words, the gateway server 22 performs the connection transfer (e.g., communication link transfer 27) for the mobile device 26-1 at a transfer rate that supports substantially uninterrupted voice communication during the connection transfer 27 to the mobile device 26-1 from a voice communication source through the first access point 24-1 to the mobile device 26-1 and from the voice communication source through the third access point 24-3 to the mobile device 26-1. In one example, this transfer rate is less than about 80 milliseconds for the completion of the connection transfer 27.

Figure 3:
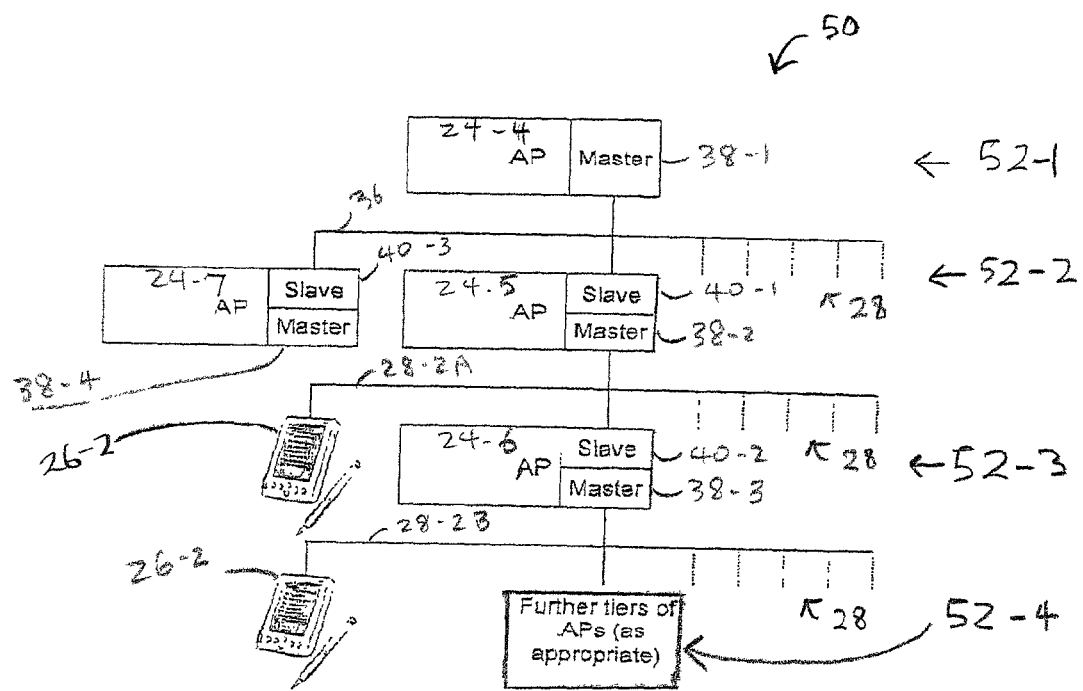
FIG. 3 is a block diagram of a hierarchy of access points showing several tiers of access points, according to the present invention

FIG. 3 is a block diagram of a networked hierarchy 50 of access points 24-4, 24-5, 24-6, 24-7 (also termed an "access point network" 50 or "AP-net" 50) showing several tiers 52-1, 52-2, 52-3, 52-4 of access points 24 for a Bluetooth embodiment of the present invention. The access point 24-4 at the top of the hierarchy 50 is henceforward referred to as the "gold" access point 24-4, and those in the second and third tiers are referred to as "silver" access points 24-5, 24-7 and "bronze" access points 24-6, respectively (see FIG. 3). The first level or first tier 52-1 includes the gold access point 24-4. The second level or tier 52-2 of the hierarchy 50 includes a silver access point 24-5 (intermediary access point) and another silver access point 24-7. A third level or tier 52-3 of the hierarchy 50 includes a bronze access point 24-6. The use of the terms "gold access points," "gold tier," "silver access points," "silver tier," "bronze access points," and "bronze tier" is for purposes of example, and other terms, such as "first access point," "first tier," "second access point," "second tier," and "third access point," "third tier," could be used equivalently.

There are two goals to the networked hierarchy 50:
1. To enable a large physical area to be covered. See FIG. 4 which illustrates a shaded circle 56-1 that shows the coverage area of the gold access points 24-4 while the unshaded circles 56-2, 56-3, 56-4 show the coverage area of the silver access points 24-5, 24-7, 24-8.

2. To enable the synchronization of a large number of access points 24, in a Bluetooth embodiment of the invention, the Bluetooth specification limits the number of active devices 24, 26 in a piconet to eight, including the master 24. Consequently, the maximum number of active silver access points 24 is seven and the maximum number of active bronze access points 24 is 49. It is possible to increase the number of access points 24 in a particular tier 52 by "parking" devices 26 for certain periods of time. The number of synchronized access points 24 in the networked hierarchy 50 may also be increased by adding further tiers 52-4.

The networked hierarchy 50 of access points 24-4 through 24-7 may be pre-programmed into the access points 24-4 through 24-7 themselves, allocated by a central control device or gateway server 22 to which the access points 24-4 through 24-7 are linked, or determined by the exchange of data between the access points 24-4 through 24-7 over the radio interface once they are initialized. In one embodiment, the present invention provides an optimization algorithm that minimizes the number of tiers 52 and reconfigures the network hierarchy 50 accordingly.

The number of levels in the hierarchy 50 is not limited to three or any specific number and further tiers 52-4 of access points 24 may be included as lower levels below the bronze access point 24-6 or bronze tier 52-3. The gold access point 24-4 includes a master timing module 38-1. The master time module 38 (e.g., 38-1, 38-2, 38-3, 38-4) provide a timing pattern 44 when the access point 24-4 through 24-7 has the role of being a master in a network 50.

In a Bluetooth implementation of the present invention, such a network is a piconet, and the access point 24 that functions as a master can have up to seven slaves (that is, slave access points 24) in a conventional piconet. For example, the silver access point 24-5 includes a slave timing module 40-1. The slave timing module 40 (e.g., 40-1, 40-2, 40-3) is a timing module that provides a timing pattern 46 that is synchronized with a master timing pattern 44, such as maintained by a master timing module 38. For example, the silver access point 24-5 includes a slave timing module 40-1 and a master timing module 38-2. The silver access point 24-7 includes a slave timing module 40-3 and a master timing module 38-4. The bronze access point 24-6 includes a slave timing module 40-2 and a master timing module 38-3. Generally the slave timing module 40 is synchronized with a master timing module 38 for that individual piconet. Each of the foregoing follow the synchronization method of the present invention as previously described in FIGS. 1 and 2.

The mobile device 26-2 is connected by a wireless connection (initial link) 28-2A to the silver access point 24-5. As illustrated in FIG. 3, the same mobile device 26-2 is transferred to the connection (transferred link) 28-2B to the access point 24-6. If the hierarchy 50 is properly synchronized according to the techniques of the present invention, then the mobile device 26-2 can transfer the connection 28-2A from the silver access point 24-5 to connection 28-2B with the bronze access point 24-6 without requiring resynchronization of the mobile device 26-2.

Figure 4:
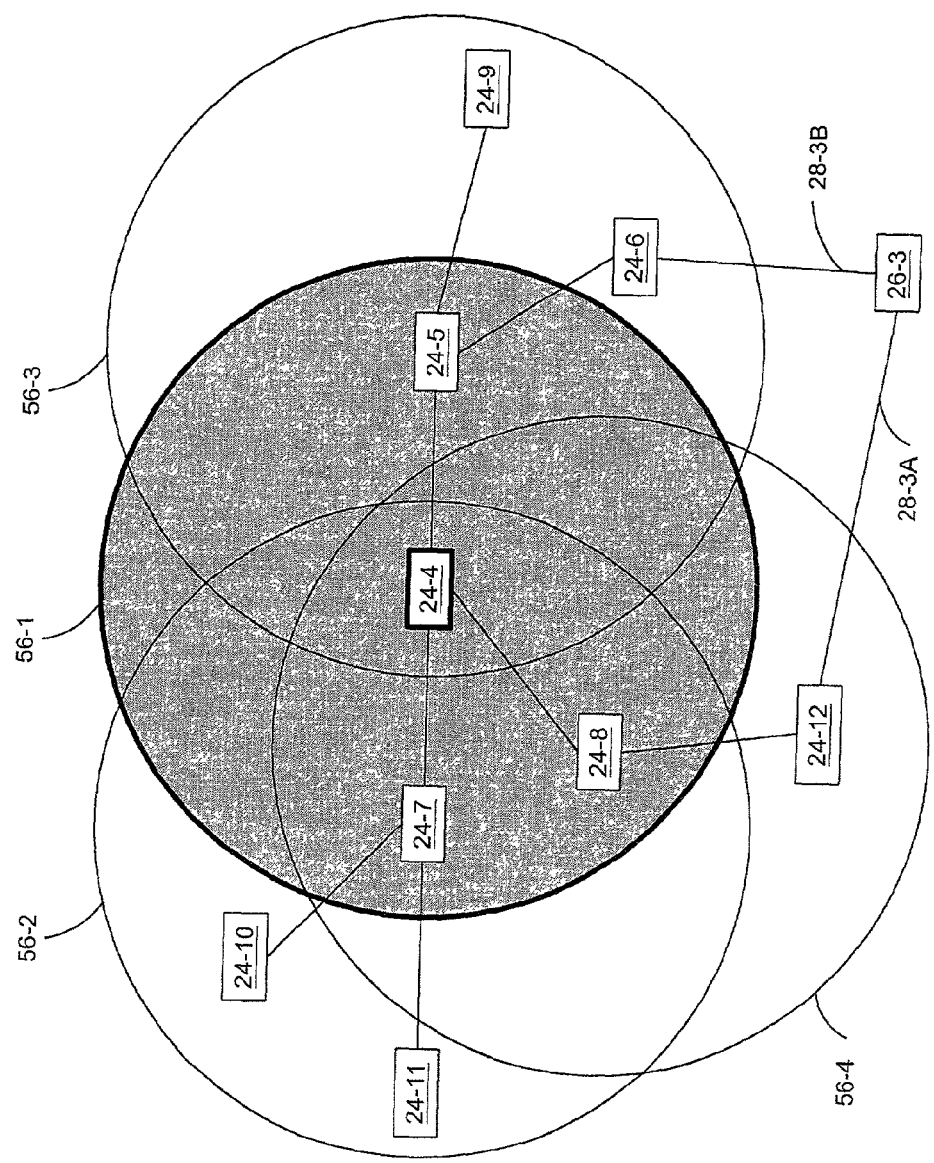
FIG. 4 is a schematic diagram showing a transfer of a mobile device between overlapping coverage areas for the present invention.

FIG. 4 is a schematic diagram showing a transfer of a mobile device 26-3 between overlapping coverage areas 56-3, 56-4.

In a Bluetooth implementation, the access points 24 comprising a single network are placed so that each access point 24-4 through 24-12 is within the range required to maintain good Bluetooth radio contact with at least one other access point 24-4 through 24-12 (see FIG. 4). Depending on the class of Bluetooth radio interface that is built into the access points 24-4 through 24-12, the antenna design, the number of obstructions and the amount of interference present, the maximum separation between access points 24-4 through 24-12 is likely to be in the range of 20–200 meters.

In FIG. 4, gold access point 24-4 is shown with an access area indicated by a circular coverage area 56-1. The silver access point 24-7 has an access area indicated by circular coverage area 56-2. The silver access point 24-5 is shown with an access area indicated by coverage area 56-3, and a further silver access point 24-8 has a coverage area 56-4. FIG. 4 also shows other access points 24 at the third or bronze level of the hierarchy 50, which include access points 24-6, 24-9, 24-10, 24-11 and 24-12. Also shown in FIG. 4 is a mobile device 26-3 which has transferred its wireless connection (initial link) 28-3A from access point 24-12 to a wireless connection (transferred link) 28-3B to access point 24-6. If the hierarchy 50 shown in FIG. 4 is synchronized according to the techniques of the present invention, then the third or bronze level access point 24-6 is synchronized with the third or bronze access point 24-12, and the mobile device 26-3 can make the transfer between the access points 24-6 and 24-12 without having to be resynchronized or change its synchronization.

Figure 5:
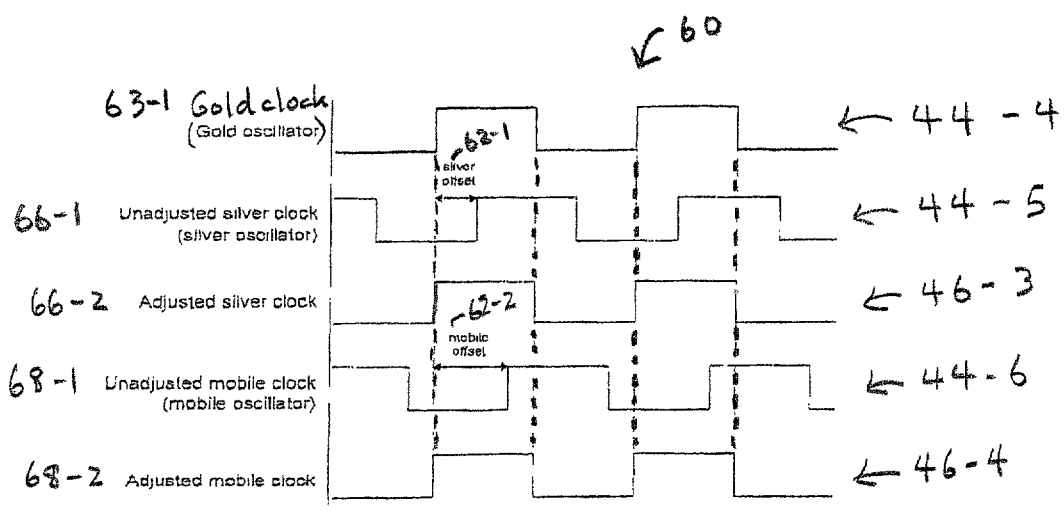
FIG. 5 is a timing diagram showing clock signals for a hierarchy of access points and a mobile device according to the present invention.
Figure 6:
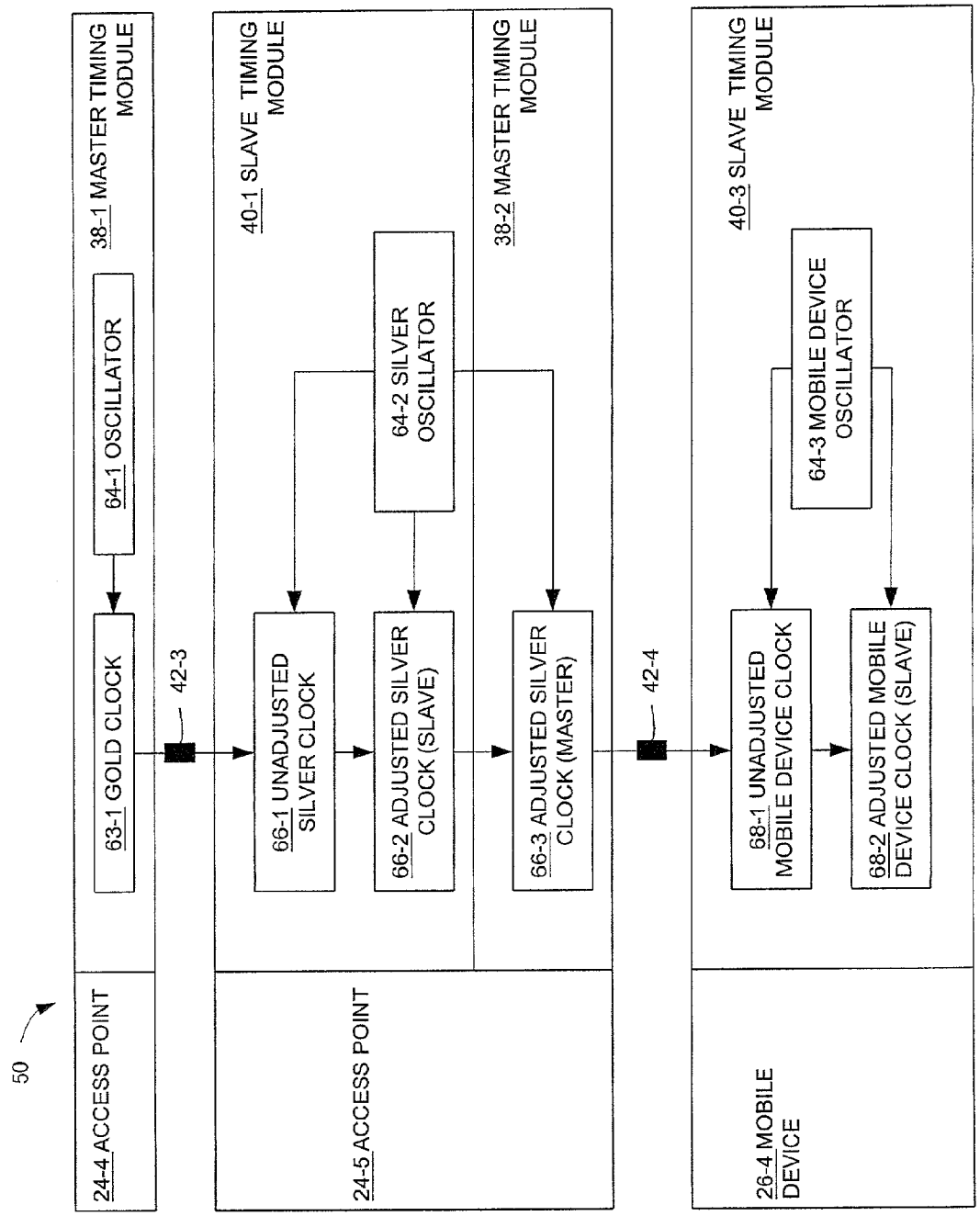
FIG. 6 is a block diagram of a hierarchy showing two access points and a mobile device suitable for use with FIG. 5.

FIG. 5 is a timing diagram showing clock signals 44-4, 44-5, 46-3, 44-6, 46-4 for a networked hierarchy 50 of access points 24 and a mobile device 26 (see also FIG. 6). The timing pattern 44-4 shows a timing signal for a gold clock 63-1 produced by a gold oscillator 64-1 (see FIG. 6) which is contained in or associated with a gold access point 24-4. The unadjusted silver timing pattern 44-5 shows an unadjusted timing pattern for a silver access point 24-5 produced by the unadjusted silver clock 66-1. The offset between the two timing patterns 44-4 and 44-5 is illustrated by a silver offset 62-1, which indicates a timing value or clock offset that would need to be added to or subtracted from the unadjusted silver timing pattern 44-5 to ensure that it would match the gold or initial timing pattern 44-4. In terms of the silver clock 66-1, the synchronized timing pattern 46-3 shows the timing pattern after the silver offset 62-1 has been added to or subtracted from the unadjusted silver clock 66-1. The adjusted silver clock 66-2 indicates the timing or values of the unadjusted silver clock 66-1 after the silver clock offset 62-1 has been added to or subtracted from the unadjusted silver clock 66-1.

The unadjusted timing pattern 44-6 illustrates an unadjusted timing pattern produced by an unadjusted mobile device clock 68-1 for a mobile device 26 to be synchronized with the silver access point 24-5. The mobile device offset 62-2 is a clock offset or timing value that needs to be added to or subtracted from the unadjusted timing pattern 44-6 to produce an adjusted mobile device clock 68-2 which would produce the synchronized timing pattern 46-4.

For a Bluetooth embodiment of the present invention, once the hierarchy 50 is established, a gold access point 24 sets up a Bluetooth piconet with silver access points 24 in which the gold access point 24 is the master and the silver access points 24 are slaves. For a traditional Bluetooth piconet, the Bluetooth specification describes how, as part of this process, each silver access point 24 should measure the difference in phase between its internal oscillator and the clock of the gold access point 24 and apply an offset to bring its clock into phase with the internal oscillator of the gold access point 24.

For a Bluetooth embodiment, the internal oscillator (e.g., 64-1, 64-2, 64-3, as shown in FIG. 6) may be inaccurate (the Bluetooth specification allows clock inaccuracies of up to ±20 parts per million in active mode and ±250 parts per million in other modes). Generally, whenever a silver access point 24 receives a timing packet 42 from a gold access point 24, it is able to re-synchronize if necessary by adjusting its clock offset 62 (e.g, the silver offset 62-1 in FIG. 5). To maintain synchronization, at regular intervals the gold access point 24 broadcasts packets 42, and the silver access points 24 listen as slaves for these packets 42 (in Bluetooth networks, park mode can be used to ensure that the silver access points 24 listen in the appropriate time slots). The gold access point 24 broadcasts packets 42 sufficiently often that any silver access points 24 in range which satisfies the clock accuracy requirements of the Bluetooth specification cannot lose synchronization in the interval between two broadcasts, but not so often as to impose an unnecessary overhead on the network hierarchy 50.

For a Bluetooth embodiment, in the remaining time slots, when a silver access points 24 is not acting as a slave to a gold access point 24, it can be used to form additional piconets in which the silver access point 24 is the master. As described above, the clock-offset value 62 in a master device 24 is normally set to zero. Thus, in a traditional Bluetooth approach, when a Bluetooth device participates as a slave 24 in one piconet and a master 24 in another, the two piconets are not synchronized, so guard periods need to be left at the start and end of transmissions to prevent collisions from occurring. In a Bluetooth approach, these guard periods represent "wasted" time slots, which reduce the efficiency of radio spectrum use. The approach of the present invention eliminates such guard periods by enabling the two piconets to be synchronized when an access point 24 is a slave in one of the piconets and a master in another one of the piconets.

FIG. 6 illustrates a block diagram of a networked hierarchy 50 showing two access points 24-4, 24-5 and a mobile device 26-4 for a Bluetooth embodiment of the present invention. The top level or gold access point 24-4 includes the master timing module 38-1 which includes an oscillator 64-1 for the gold clock 63-1 for the master timing module 38-1.

The access point 24-5 includes a slave timing module 40-1 and a master timing module 38-2. The access point 24-5 includes a silver oscillator 64-2. The silver oscillator 64-2 provides the timing or clock values for an unadjusted silver clock 66-1. The clock 66-1 is then adjusted based on the clock offset 62-1 to become an adjusted clock 66-2. The master timing module includes an adjusted silver clock 66-3.

The mobile device 26-4 includes a slave timing module 40-3. The mobile device 26-4 includes a mobile device oscillator 64-3 for the mobile device clock 68-1. The slave timing module 40-3 includes an unadjusted mobile clock 68-1 and the adjusted mobile clock 68-2 which is based on the unadjusted mobile 68-1 and a mobile device offset 62-2 as shown in FIG. 5.

In FIG. 6, the silver access point 24-5 on the slave side timing module 40-1 measures the phase difference or clock offset 62-1 (see FIG. 5) between the unadjusted silver clock 66-1 and the gold clock 63-1 as determined by a timing signal 42-3 received from the gold access point 24-4. The silver access point 24-5 on the slave timing module 40-1 applies the offset 62-1 to synchronize its clock to produce the adjusted silver clock 66-2 that is synchronized with the gold clock 63-1. The silver access point 24-5, in the master timing module 38-2, uses the same offset 62-1 in the master side timing module 38-2 for a master adjusted silver clock 66-3.

The mobile device 26-4 measures a phase difference or clock offset 62-2 (see FIG. 5) between its unadjusted mobile device clock 68-1 and the adjusted silver clock 66-3 for the master timing module 38-2 of the silver access point 24-5 as determined from a timing signal 42-4 received from the silver access point 24-5. The slave timing module 40-3 of the mobile device 26-4 applies the offset 62-2 to synchronize its unadjusted mobile device clock 68-1 with the adjusted silver clock 66-3 on the master timing module 38-2 of the silver access point 24-5. The result is the adjusted mobile device clock 68-2 of the slave timing module 40-3 of the mobile device 26-4. Ultimately, the adjusted mobile device clock 68-2 is thus synchronized with the gold clock 63-1 of the master timing module 38-1 of the gold access point 24-4.

The approach of the present invention uses the same offset value (e.g., 62-1) in the time slots when the silver access point 24-5 is operating as a master (to the mobile device 26-4) and in the time slots when it is operating as a slave (to the gold access point 24-5). This has the effect of synchronizing the piconets in which the silver access point 24-5 is a master with the gold access point 24-4. In one embodiment, a clock offset value (e.g, 62-1) is transferred from timing data storage (registers) in the slave timing module (e.g., 40-1) of the silver access point 24-5 to timing data storage (registers) in the master timing module (e.g., 38-2) of the silver access point 24-5 (see FIG. 7).

In general, in the approach of the present invention, the slaves to the silver access points 24 may be third tier (bronze) access points 24 or mobile devices 26 (in FIG. 6 the third tier device is assumed to be a mobile device 26-4). In the case where they are bronze access points 24, the process described above may be used to maintain the bronze access points 24 in synchronization with the rest of the network hierarchy 50 and to ensure that devices 24, 26 connected to the bronze access points 24 are also synchronized (in theory, an unlimited number of tiers 52 can be synchronized).

Once all the access points 24 in a Bluetooth network (e.g., network hierarchy 50) are synchronized, a mobile device 26 may be handed off from one access point 24 to another by transferring unique session data (such as master Bluetooth device addresses and encryption keys) from the first access point 24 to the second 24, and so on. The movement of session data between access points 24 is controlled by a central device or gateway server 22, which ensures that the correct data is transferred.

In an IEEE 802.11 embodiment of the present invention, there is a similar hierarchy 50 of access points 24 (e.g., as in FIG. 3 or FIG. 6) used in order to synchronize clocks (e.g., 63-1 and 66-1), but the clocks (e.g., 63-1 and 66-1) are used to drive the access point timing beacons (e.g., 42-3 and 42-4). In order for an access point (e.g., 24-5) lower in the hierarchy 50 to synchronize to the appropriate access point (e.g., 24-4), the lower level access point (e.g., 24-5) listens for the beacon (e.g., 42-3) of the higher level access point (e.g., 24-4) as if the lower level access point (e.g., 24-5) were a mobile device 26 and resets the clock (66-1) of the lower level access point (e.g., 24-5) so that its beacon (e.g., 42-4) is synchronized. This is the same process as followed by a mobile device 26 joining an "Infrastructure" (hierarchical) network controlled by an access point 24. In the approach of the present invention, the synchronization is maintained when the lower level access point (e.g., 24-4) switches back to its role as an access point 24.

Figure 7:
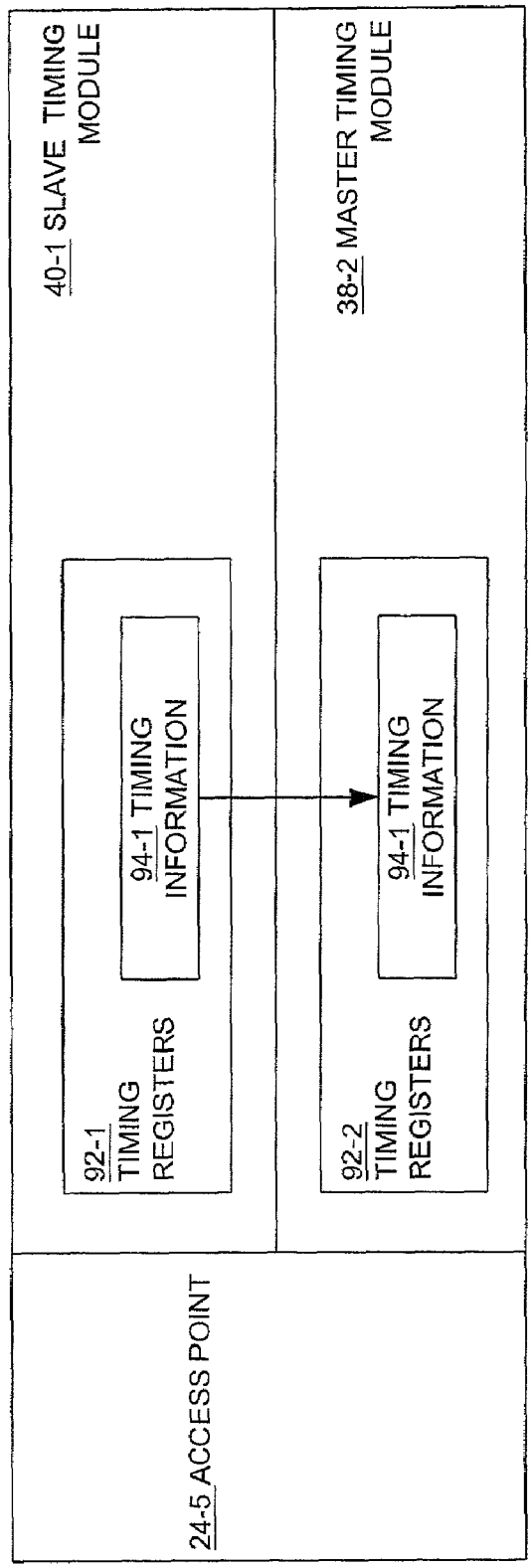
FIG. 7 is a block diagram of timing registers in one access point of FIG. 6.

FIG. 7 is a block diagram of timing registers 92-1, 92-2 in the access point 24-5 of FIG. 6, according to the present invention. The slave timing module 40-1 includes the timing register 92-1 that controls a slave clock phase for the slave role in a piconet. The master timing module 38-2 includes timing register 92-2 that controls a master clock phase for a master role in a piconet. The timing registers 92-1, 92-2 are data storage devices (e.g., memory, bit registers, or other data storage) that store timing information 94-1. The timing information 94-1 is timing information (e.g., clock offset 62-1) used to adjust a clock (e.g., unadjusted clock 66-1) associated with the access point 24-5 to produce an adjusted clock (e.g., 66-2) for use by the slave timing module 40-1. The slave timing module 40-1 uses the timing information 94-1 to synchronize the adjusted clock 66-2 with a master timing module (e.g., 38-1 in FIG. 6). The slave timing module 40-1 transfers the timing information 94-1 to the timing register 92-2 so that the master timing module 38-2 can use the timing information 94-1 to adjust the clock 66-1 to provide an adjusted clock 66-3 for use by the master timing module 38-2.

In one embodiment, the timing registers 92-1, 92-2 are existing (general purpose) registers assigned for timing (or data storage) purposes. For example, the timing registers 92-1, 92-2 are assigned and controlled by microcode hosted and executing on a microprocessor in the access point 24-5.

Figure 8:
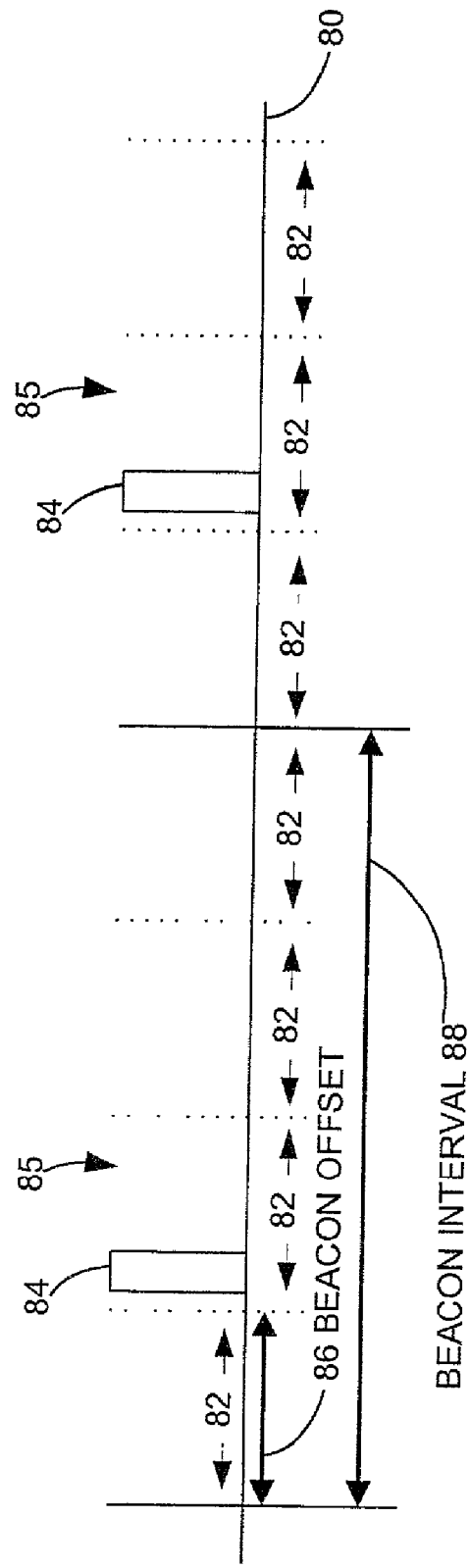
FIG. 8 is a timing diagram showing a timing beacon according to the present invention.

FIG. 8 is a timing diagram for a time division network 45 illustrating time slots (also referred to as "slot pairs") 82 arranged along a timing axis 80. FIG. 8 shows a timing beacon 84, a beacon offset 86, and a beacon interval 88. The timing beacon 84 is one example of a timing signal 42.

In a preferred embodiment for a Bluetooth implementation of the present invention, a master access point 24 broadcasts a timing beacon 84 that serves the role of the timing signal 42 to accomplish the timing synchronization. The timing beacon 84 consists of a NULL packet. The master access point 24 sends the timing beacon 84 in a reserved time slot known to both the timing master (access point 24 fulfilling the role of master such as 24-4 in FIG. 6) and the timing slave (access point 24 fulfilling the role of the slave, such as 24-5 in FIG. 6). Any one timing master 24 will broadcast a single beacon 84 that all of its timing slaves 24 use for synchronization. Within the WLAN, multiple timing masters 24 may broadcast a beacon 84 either in the same absolute time slot 82 or in a different time slot 82, which is controlled by an offset parameter or beacon offset 86 provided by the gateway server 22. The beacon interval 88 controls the number of unique slots available for beacons 84.

As can be seen from FIG. 8, the beacon 84 does not necessarily start at the beginning of the beacon interval 88. The offset 86 specifies when the beacon 84 should start (accurate to a slot-pair or time slot). This allows multiple timing masters 26 to broadcast their beacons 84 at different offsets 86 so as not to interfere with each other. The "beacon instant" 85 is defined as being the slot 82 in which a particular beacon 84 is actually broadcast.

The gateway server 22 provides the timing master 24 with the parameters of its own timing beacon 84 and provides a timing slave 24 or 26 with the parameters of a beacon 84 (or multiple beacons 84) that the slave 24 or 26 is to receive.

The gateway server 22 does not provide the initial beacon instant 85, which is calculated internally to the access points 24. As the beacon interval 88 is a power of 2 there are no problems with clock wrap.

Due to the possibility that multiple timing slaves 24, 26 may connect and disconnect at any time, and that there is a limit of AM_ADDR's (Bluetooth active member addresses), the timing beacon 84 is broadcast (i.e., it will have an AM_ADDR of zero).

In a preferred embodiment, the timing master 24 is configured to broadcast its beacon 84 in the next available slot-pair (time-slot 82) after a timing master 24 (e.g., silver master 24-5) has received a beacon 84 (i.e., timing signal 42-3) from its own master 24 (e.g., gold master 24-4). This approach allows the beacons 84 to rapidly filter down the network hierarchy 50, thus minimizing any clock drift problems. However, the present invention does not place any restriction on how the gateway server 22 configures a timing master 24 to broadcast its beacon 84 beyond requiring that the broadcast at least takes place in the next available slot-pair (time slot 82). That is, beacons 84 are not transmitted on the normal RX slot of a slot-pair.

The approach of the present invention, in a preferred embodiment, requires the gateway server 22 to provide each access point 24 with a list of one or more timing masters 24 that each access point 24 can listen to. The gateway server 22 also tells each access point 24 if it is to be a timing master itself. The gateway server 22 manages the configuration of the timing beacon 84 to allow run-time modifications to be made. Each timing beacon 84 requires the following information:

$T_{TB}$—the timing beacon interval 88 (measured in slots)
$D_{TB}$—the timing beacon offset 86 within the interval 88 (measured in slot-pairs)

In addition, each access point 24 (other than the golden access point, such as 24-4) needs to know the BDADDR (Bluetooth device address) of its timing master(s) 24 to allow it to page and/or listen for the beacon 84.

$T_{TB}$ is not directly supplied by the gateway server 22. The access point 24 computes the timing beacon interval 88 from the value for $N_{TB}$ provided by the gateway server 22. This value expresses the beacon interval 88 as a power of 2 (to allow beacon 84 halving and doubling). $N_{TB}$ is a positive integer in the range:

$$1 \leq N_{TB} \leq 25$$

The access point 24 then computes $$T_{TB} = 2^{N_{TB}}$$

$T_{TB}$ (and thus $N_{TB}$) is measured in slots. Note that the value $N_{TB}=0$ is a reserve used for other purposes. Therefore, while $T_{TB}$ is measured in slots, the gateway server 22 can only set it to an accuracy of a slot-pair. $D_{TB}$ is supplied directly from the gateway server 22. It must be in the range:

$$0 \leq D_{TB} \leq \left(\frac{T_{TB}}{2} - 1\right)$$

(i.e., DTB is measured in slot-pairs).

The gateway server 22 has the option of providing more than one potential timing master 24 to an access point 24 when the access point 24 starts up. The access point 24 starts using the first timing master 24 (provided by the gateway server 22) and will switch to subsequent timing masters 24 (of those provided by the gateway server 22) if the access point 24 loses the beacon 84 from the first timing master 24.

The basic operation for a new access point 24 trying to associate with a network hierarchy 50 (or AP-net) is as follows:

1. Perform an inquiry to find nearby access points 24.
2. Create a normal ACL (Asynchronous Connection-less) link to each access point 24 to monitor the RSSI (Received Signal Strength Indication), and disconnecting once the RSSI has been obtained.
3. Start up in access point mode with a list of one or more potential timing masters 24. The gateway server 22 derives this list based on the RSSI for each link, and possibly other criteria.
4. Optionally set up a timing beacon 84 to the allow the access point 24 to become a timing master.

Steps 1 and 2 in the above list of steps can be performed at any time, as these steps (1 and 2) use the standard Bluetooth technology Inquiry and Connection procedures (in a Bluetooth embodiment of the present invention). In step 3, if no timing masters 24 are provided, then the access point 24 is to be a golden access point 24 (such as access point 24-4 in FIG. 6). The golden access point status can only be removed if the golden access point 24 is subsequently connected to a silver access point 24 (such as access point 24-5 in FIG. 6). Step 4 can be performed at any time after access point 24 operation has started. In this case, any existing timing beacon 84 will be modified.

In the following discussion, an Inquiry Response is the FHS (frequency hop synchronization) packet returned from an inquired device 24. An Inquiry Result is the corresponding event passed over the HCI (host controller interface) to the gateway server 22 (which may contain details on more than one found device 24).

The initial Inquiry procedure is used to find nearby access points 24. The gateway server 22 instructs the new access point 24 to perform the inquiry (and may optionally ask for event filtering to only pass a certain class of device if this is fixed for all access points 24). For each Inquiry Result, the gateway server 22 can compare the returned BDADDR with its list of BDADDR's currently assigned to access points 24, in order to filter out Bluetooth devices that are not assigned. This approach of the present invention therefore requires that surrounding access points 24 each have a CPB (current pool BDADDR) allocated to them. The present invention uses the CPB approach, because there is a separate BDADDR per session (rather than the traditional Bluetooth approach of a globally unique BDADDR per device). The CPB approach of the present invention avoids running out of BDADDR's by providing a pool (e.g., CPB) of BDADDR's that can be reused on each network (e.g., customer network).

After the Inquiry period has completed, the gateway server 22 instructs the new access point 24 to connect to the first timing master access point such as 24-4 (using normal Bluetooth technology connection procedures). Once the ACL link has been established (and the timing master 24 has performed the role switch), the gateway server 22 instructs the timing master 24 to perform prioritization on the link.

The timing master 24 will return an RSSI value to the gateway server 22 at the end of the prioritization. This value could be used as an equivalent for the RSSI at the new access point 24. Alternatively, in one embodiment, the gateway server 22 can issue an HCI command provided by the present invention, such as HCIX_ReadAbsoluteRSSI, to the new access point 24 to get the exact value. (It is unlikely that there will be any asymmetry in the link as both access points 24 should be using the same hardware, but this option is available if it is required). The new access point 24 will automatically update its RSSI as it receives POLL packets from the timing master 24, so an HCI command can be used to obtain this.

Once prioritization has finished, the gateway server 22 can disconnect the ACL link and repeat the process for all other access points 24 it wishes to obtain the RSSI for. After the gateway server 22 has the RSSI for each potential timing master 24, the gateway server 22 makes a decision as to which access point 24 shall provide a timing beacon 84. If it wishes (and assuming there were enough Inquiry Results), the gateway server 22 can also specify secondary timing masters 24, in case there are connection problems.

Note that the gateway server 22 is not required to perform an Inquiry to find nearby access points 24. The option is provided to allow ad hoc additions to the AP net 50. Also note that this procedure can be performed before the HCIX_StartRAP command (an HCI command provided by the present invention in one embodiment) has been sent to any access points 24. Therefore, the potential timing masters 24 may be page scanning using their internal BDADDR's rather than a CPB.

The method of starting an access point 24 is to send it an HCIX_StartRAP with a list of zero or more timing masters 24. If the list is empty, then the access point 24 is a golden access point 24 (e.g., 24-4). The new access point 24 will then attempt to connect to the first timing master 24 in the list in order to obtain accurate timing information. It is assumed that all listed timing masters 24 are broadcasting beacons.

Note that the initial HCIX_StartRAP must provide the new access point 24 with parameters related to each of the allocated timing masters 24. These are:

$N_{TB}$ $D_{TB}$

The CPB currently allocated to the timing master 24

The factory-defined BDADDR of the timing master 24 (as the internal address is used to derive the Channel Access Code that the beacon 84 is broadcast with).

If a mobile device 26 has since connected to the timing master 24 then the CPB assigned to it is used up, and the connection attempt will fail. If the access point 24 cannot connect to the primary timing master 24, the access point 24 moves onto the next one in the list, either until the access point 24 has connected or the list has been exhausted. For each timing master 24 the access point 24 cannot connect to, the access point 24 sends an HCIX_Evt_TimingMasterFailure command (an HCI command provided by the present invention in one embodiment) to the gateway server 22. If the access point 24 cannot connect to any timing master 24, then the HCIX_StartRAP command fails and the access point 24 returns to operation as a normal Bluetooth device. The connection to the timing master 24 is detached before a Connection Complete event has been sent to the gateway server 22; therefore, the timing master 24 reuses its existing CPB and immediately starts scanning again.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for synchronizing access points in a wireless local area network to enable a seamless transfer of a mobile device in the wireless local area network, communications in the wireless local area network being based on a plurality of timing patterns, the method comprising the steps of:

designating as a top level in a hierarchy of piconets and a second piconet designed as a second level in the hierarchy, and wherein an initial access point has a master role for the first piconet, a second access point has a slave role in the first piconet, the second access point has a master role for the second piconet concurrently with having the slave role in the first piconet, and a third access point has a slave role in the second piconet, wherein the second access point has a first set of timing registers controlling a slave clock phase for the slave role in the first piconet, and a second set of timing registers controlling a master clock phase for the master role in the second piconet;

synchronizing the second access point having a second timing pattern of the plurality of timing patterns with the initial access point having an initial timing pattern of the plurality, the second access point adjusting the second timing pattern to match the initial timing pattern to produce a synchronized second timing pattern for use by the second access point;

synchronizing the third access point having a third timing pattern of the plurality of timing patterns with the second access point, by adjusting the third timing pattern to match the synchronized second timing pattern of the second access point to produce a synchronized third timing pattern for use by the third access point;

transferring a clock offset value from the first set of timing registers to the second set of timing registers to synchronize the slave role in the first piconet with the master role in the second piconet; and transferring a connection for the mobile device by transferring an initial link between the mobile device and the initial access point to a transferred link between the mobile device and the third access point to provide for the seamless transfer of the mobile device as a function of synchronization of the initial access point with the third access point based on the initial timing pattern and the synchronized third timing pattern.

2. The method of claim 1, wherein the initial access point, the second access point, and the third access point form a set of synchronized access points; and wherein the method further comprises steps of:

providing further access points in the wireless local area network; and synchronizing each further access point with one of the synchronized access points so that each further access point joins the set of synchronized access points to enable the seamless transfer of the mobile device from any one of the set of synchronized access points to any other one of the set of synchronized access points.

3. The method of claim 1, wherein the method further includes a step of eliminating guard periods in transmissions of the second access point based on performing the steps of synchronizing the initial access point with the second access point and synchronizing the third access point with the second access point.

4. The method of claim 1, wherein the step of transferring the connection for the mobile device is performed at a transfer rate that supports substantially uninterrupted voice communication to the mobile device from a voice communication source through the first access point and through the third access point during the step of transferring.

5. The method of claim 4, wherein the transfer rate is less than about 80 milliseconds.

6. The method of claim 1, wherein the step of synchronizing the second access point includes receiving at the second access point a first timing beacon provided by the initial access point, and the step of synchronizing the third access point includes receiving at the third access point a second timing beacon provided by the second access point.

7. The method of claim 5, wherein the wireless local area network is based on a spread-spectrum wireless communications protocol.

8. A gateway server for synchronizing access points in a wireless local area network to enable a seamless transfer of a mobile device in the wireless local area network, communications in the wireless local area network being based on a plurality of timing patterns, the gateway server comprising:
  a communication interface for communicating with an initial access point, a second access point, and a third access point; the initial access point having an initial timing pattern of the plurality of timing patterns, the second access point having a second timing pattern of the plurality, and the third access point having a third timing pattern of the plurality, wherein the second access point has a first set of timing registers controlling a slave clock phase for the slave role in a first piconet, and a second set of timing registers controlling a master clock phase for the master role in a second piconet; and
  a digital processor coupled to the communication interface, the digital processor hosting and executing a gateway application that configures the digital processor to:
    designate the first piconet as a top level in a hierarchy of piconets and the second piconet designed as a second level in the hierarchy, and wherein the initial access point has a master role for the first piconet, the second access point has a slave role in the first piconet, the second access point has a master role for the second piconet concurrently with having the slave role in the first piconet, and the third access point has a slave role in the second piconet;
    direct the second access point to synchronize with the initial access point, the second access point adjusting the second timing pattern to match the initial timing pattern to produce a synchronized second timing pattern for use by the second access point;
    direct the third access point to synchronize with the second access point, the third access point adjusting the third timing pattern to match the synchronized second timing pattern of the second access point to produce a synchronized third timing pattern for use by the third access point;
    instruct the second access point to transfer a clock offset value from the first set of timing registers to the second set of timing registers to synchronize the slave role in the first piconet with the master role in the second piconet; and
    perform a connection transfer of an initial link between the mobile device and the initial access point to a transferred link between the mobile device and the third access point to provide for the seamless transfer of the mobile device as a function of synchronization of the initial access point with the third access point based on the initial timing pattern and the synchronized third timing pattern.

9. The gateway server of claim 8, wherein the initial access point, the second access point, and the third access point form a set of synchronized access points; and wherein the wireless local area network comprises further access points; and the gateway application configures the digital processor to instruct each further access point to synchronize with one of the synchronized access points so that each further access point joins the set of synchronized access points to enable the seamless transfer of the mobile device from any one of the set of synchronized access points to any other one of the set of synchronized access points.

10. The gateway server of claim 8, wherein the gateway application configures the digital processor to instruct the second access point to eliminate guard periods in transmissions of the second access point based on synchronizing the initial access point with the second access point and synchronizing the third access point with the second access point.

11. The gateway server of claim 8, wherein the gateway application configures the digital processor to perform the connection transfer for the mobile device at a transfer rate that supports substantially uninterrupted voice communication to the mobile device from a voice communication source through the first access point and through the third access point during the connection transfer.

12. The gateway server of claim 11, wherein the transfer rate is less than about 80 milliseconds.

13. The gateway server of claim 8, wherein the gateway application configures the digital processor to instruct the second access point to receive a first timing beacon provided by the initial access point, and to instruct the third access point to receive a second timing beacon provided by the second access point.

14. The gateway server of claim 13, wherein the wireless local area network is based on a spread-spectrum wireless communications protocol.

15. A system for synchronizing access points in a wireless local area network to enable a seamless transfer of a mobile device in the wireless local area network, communications in the wireless local area network being based on a plurality of timing patterns, the system comprising:
  a second access point in communication with an initial access point, the second access point for synchronizing the second access point with the initial access point, the initial access point having an initial timing pattern of the plurality of timing patterns, the second access point having a second timing pattern of the plurality and adjusting the second timing pattern to match the initial timing pattern to produce a synchronized second timing pattern for use by the second access point;
  a third access point in communication with the second access point, the third access point for synchronizing the third access point with the second access point, the third access point having a third timing pattern of the plurality of timing patterns and adjusting the third timing pattern to match the synchronized second timing pattern of the second access point to produce a synchronized third timing pattern for use by the third access point;
  wherein the wireless local area network includes a first piconet designated as a top level in a hierarchy of piconets and a second piconet designed as a second level in the hierarchy, and wherein the initial access point has a master role for the first piconet, the second access point has a slave role in the first piconet, the second access point has a master role for the second piconet concurrently with having the slave role in the first piconet, and the third access point has a slave role in the second piconet and the second access point has a first set of timing registers controlling a slave clock phase for the slave role in the first piconet. and a second set of timing registers controlling a master clock phase for the master role in the second piconet; and
  a gateway server in communication with the initial access point, the second access point, and the third access point, the gateway server for transferring a clock offset value from the first set of timing registers to the second set of timing registers to synchronize the slave role in the first piconet with the master role in the second piconet and performing a connection transfer of an initial link between the mobile device and the initial access point to a transferred link between the mobile device and the third access point to provide for the seamless transfer of the mobile device as a function of synchronization of the initial access point with the third access point based on the initial timing pattern and the synchronized third timing pattern.

16. The system of claim 15, wherein the initial access point, the second access point, and the third access point form a set of synchronized access points; and wherein the wireless local area network comprises further access points; and each further access point synchronizes with one of the synchronized access points so that each further access point joins the set of synchronized access points to enable the seamless transfer of the mobile device from any one of the set of synchronized access points to any other one of the set of synchronized access points.

17. The system of claim 15, wherein the second access point eliminates guard periods in transmissions of the second access point based on synchronizing the initial access point with the second access point and synchronizing the third access point with the second access point.

18. The system of claim 15, wherein the gateway server performs the connection transfer for the mobile device at a transfer rate that supports substantially uninterrupted voice communication to the mobile device from a voice communication source through the first access point and through the third access point during the connection transfer.

19. The system of claim 18, wherein the transfer rate is less than about 80 milliseconds.

20. The system of claim 15, wherein the second access point receives a first timing beacon provided by the initial access point, and the third access point receives a second timing beacon provided by the second access point.

21. The system of claim 20, wherein the wireless local area network is based on a spread-spectrum wireless communications protocol.

22. A computer program product that includes a computer readable medium having computer program instructions stored thereon for synchronizing access points in a wireless local area network to enable a seamless transfer of a mobile device in the wireless local area network, communications in the wireless local area network being based on a plurality of timing pattern, such that the computer program instructions, when performed by a digital processor, cause the digital processor to:

designate as a top level in a hierarchy of piconets and a second piconet designed as a second level in the hierarchy, and wherein an initial access point has a master role for the first piconet, a second access point has a slave role in the first piconet. the second access point has a master role for the second piconet concurrently with having the slave role in the first piconet, and a third access point has a slave role in the second piconet, wherein the second access point has a first set of timing registers controlling a slave clock phase for the slave role in the first piconet, and a second set of timing registers controlling a master clock phase for the master role in the second piconet;

synchronize the second access point having a second timing pattern of the plurality of timing patterns with the initial access point having an initial timing pattern of the plurality, by adjusting the second timing pattern to match the initial timing pattern to produce a synchronized second timing pattern for use by the second access point;

synchronize the third access point having a third timing pattern of the plurality of timing patterns with the second access point, by adjusting the third timing pattern to match the synchronized second timing pattern of the second access point to produce a synchronized third timing pattern for use by the third access point;

transfer a clock offset value from the first set of timing registers to the second set of timing registers to synchronize the slave role in the first piconet with the master role in the second piconet; and transfer a connection for the mobile device by transferring an initial link between the mobile device and the initial access point to a transferred link between the mobile device and the third access point to provide for the seamless transfer of the mobile device as a function of synchronization of the initial access point with the third access point based on the initial timing pattern and the synchronized third timing pattern.

23. A method for synchronizing access points in a wireless local area network to enable a seamless transfer of a mobile device in the wireless local area network, communications in the wireless local area network being based on a plurality of timing patterns, the method comprising the steps of:

designating as a top level in a hierarchy of piconets and a second piconet designed as a second level in the hierarchy, and wherein an initial access point has a master role for the first piconet, a second access point has a slave role in the first piconet, the second access point has a master role for the second piconet concurrently with having the slave role in the first piconet, and a third access point has a slave role in the second piconet, wherein the timing patterns are based on time slots and wherein the second access point performs a plurality of further slave roles in the first piconet in a first set of time slots available to the second access point, and the second access point performs a plurality of further master roles for further piconets in a second set of time slots selected from time slots available to the second access point exclusive of the first set of time slots.

synchronizing the second access point having a second timing pattern of the plurality of timing patterns with the initial access point having an initial timing pattern of the plurality, the second access point adjusting the second timing pattern to match the initial timing pattern to produce a synchronized second timing pattern for use by the second access point;

synchronizing the third access point having a third timing pattern of the plurality of timing patterns with the second access point, by adjusting the third timing pattern to match the synchronized second timing pattern of the second access point to produce a synchronized third timing pattern for use by the third access point; and transferring a connection for the mobile device by transferring an initial link between the mobile device and the initial access point to a transferred link between the mobile device and the third access point to provide for the seamless transfer of the mobile device as a function of synchronization of the initial access point with the third access point based on the initial timing pattern and the synchronized third timing pattern.

24. A gateway server for synchronizing access points in a wireless local area network to enable a seamless transfer of a mobile device in the wireless local area network, communications in the wireless local area network being based on a plurality of timing patterns, the gateway server comprising:
- a communication interface for communicating with an initial access point, a second access point, and a third access point; the initial access point having an initial timing pattern of the plurality of timing patterns, the second access point having a second timing pattern of the plurality, and the third access point having a third timing pattern of the plurality; and
- a digital processor coupled to the communication interface, the digital processor hosting and executing a gateway application that configures the digital processor to:
    - designate the first piconet as a top level in a hierarchy of piconets and the second piconet designed as a second level in the hierarchy, and wherein the initial access point has a master role for the first piconet, the second access point has a slave role in the first piconet, the second access point has a master role for the second piconet concurrently with having the slave role in the first piconet, and the third access point has a slave role in the second piconet wherein the timing patterns are based on time slots and wherein the gateway application configures the digital processor to instruct the second access point to perform a plurality of further slave roles in the first piconet in a first set of time slots available to the second access point;
    - direct the second access point to synchronize with the initial access point, the second access point adjusting the second timing pattern to match the initial timing pattern to produce a synchronized second timing pattern for use by the second access point;
    - direct the third access point to synchronize with the second access point, the third access point adjusting the third timing pattern to match the synchronized second timing pattern of the second access point to produce a synchronized third timing pattern for use by the third access point;
    - instruct the second access point to perform a plurality of further master roles for further piconets in a second set of time slots selected from time slots available to the second access point exclusive of the first set of time slots; and
    - perform a connection transfer of an initial link between the mobile device and the initial access point to a transferred link between the mobile device and the third access point to provide for the seamless transfer of the mobile device as a function of synchronization of the initial access point with the third access point based on the initial timing pattern and the synchronized third timing pattern.

25. A system for synchronizing access points in a wireless local area network to enable a seamless transfer of a mobile device in the wireless local area network, communications in the wireless local area network being based on a plurality of timing patterns, the system comprising:
- a second access point in communication with an initial access point, the second access point for synchronizing the second access point with the initial access point, the initial access point having an initial timing pattern of the plurality of timing patterns, the second access point having a second timing pattern of the plurality and adjusting the second timing pattern to match the initial timing pattern to produce a synchronized second timing pattern for use by the second access point;
- a third access point in communication with the second access point, the third access point for synchronizing the third access point with the second access point, the third access point having a third timing pattern of the plurality of timing patterns and adjusting the third timing pattern to match the synchronized second timing pattern of the second access point to produce a synchronized third timing pattern for use by the third access point;
- wherein the wireless local area network includes a first piconet designated as a top level in a hierarchy of piconets and a second piconet designed as a second level in the hierarchy, and wherein the initial access point has a master role for the first piconet, the second access point has a slave role in the first piconet, the second access point has a master role for the second piconet concurrently with having the slave role in the first piconet, and the third access point has a slave role in the second piconet and the timing patterns are based on time slots; and
- a gateway server in communication with the initial access point, the second access point, and the third access point, the gateway server for:
    - instructing the second access point to perform a plurality of further slave roles in the first piconet in a first set of time slots available to the second access point, and the second access point to perform a plurality of further master roles for further piconets in a second set of time slots selected from time slots available to the second access point exclusive of the first set of time slots; and
    - performing a connection transfer of an initial link between the mobile device and the initial access point to a transferred link between the mobile device and the third access point to provide for the seamless transfer of the mobile device as a function of synchronization-of the initial access point with the third access point based on the initial timing pattern and the sycnchronized third timing pattern.

* * * * *

UNITED STATES PATENT AND TRADEMARK OFFICE
CERTIFICATE OF CORRECTION

PATENT NO.       : 7,126,937 B2
APPLICATION NO.  : 10/032199
DATED            : October 24, 2006
INVENTOR(S)      : Crosbie et al.

It is certified that error appears in the above-identified patent and that said Letters Patent is hereby corrected as shown below:

Column 17, line 59, claim 1, before "as a top", insert --a first piconet--.
Column 21, line 48, claim 22, before "as a top", insert --a first piconet--.
Column 22, line 25, claim 23, before "as a top", insert --a first piconet--.

Signed and Sealed this

Ninth Day of January, 2007

JON W. DUDAS
*Director of the United States Patent and Trademark Office*